United States Patent
Zhang et al.

(10) Patent No.: US 7,489,653 B2
(45) Date of Patent: Feb. 10, 2009

(54) FRAMEWORK AND METHOD FOR QOS-AWARE RESOURCE DISCOVERY IN MOBILE AD HOC NETWORKS

(75) Inventors: Qian Zhang, Wuhan (CN); Wenwu Zhu, Basking Ridge, NJ (US); Jiangchuan Liu, Kowloon (HK)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 11/044,685

(22) Filed: Jan. 27, 2005

(65) Prior Publication Data

US 2005/0128944 A1    Jun. 16, 2005

Related U.S. Application Data

(63) Continuation of application No. 10/051,449, filed on Jan. 18, 2002, now Pat. No. 7,113,796.

(51) Int. Cl.
- *H04L 12/26* (2006.01)
- *H04J 3/14* (2006.01)
- *G08C 15/00* (2006.01)
- *G06F 11/00* (2006.01)

(52) U.S. Cl. .................... 370/328; 370/229; 370/389; 455/445; 455/456

(58) Field of Classification Search .......... 370/229–328, 370/389–395; 455/403–418, 445–456; 709/220
See application file for complete search history.

(56) References Cited

U.S. PATENT DOCUMENTS

| | | | |
|---|---|---|---|
| 6,813,501 B2 * | 11/2004 | Kinnunen et al. | 455/456.2 |
| 2003/0048779 A1 * | 3/2003 | Doherty et al. | 370/389 |
| 2004/0087311 A1 * | 5/2004 | Haglund | 455/453 |
| 2004/0213409 A1 * | 10/2004 | Murto et al. | 380/258 |
| 2005/0128944 A1 | 6/2005 | Zhang et al. | |

OTHER PUBLICATIONS

D. Xu, K. Nahrstedt, and D. Wichadakul, "QoS-Aware Discovery of Wide-Area Distributed Services," in *Proceedings of IEEE International Symposium on Cluster Computing and the Grid*, May 2001.

S. G. Dykes, C. L. Jeffery, and K. A. Robbins, "An Empirical Evaluation of Client-Side Server Selection Algorithms," *Proceedings of IEEE INFOCOM*, Mar. 2000.

E. M. Royer and C.-K. Toh, "A Review of Current Routing Protocols for Ad Hoc Mobile Wireless Networks," *IEEE Personal Communications*, pp. 46-55, Apr. 1999.

(Continued)

*Primary Examiner*—Man Phan
(74) *Attorney, Agent, or Firm*—Lee & Hayes, PLLC (57) ABSTRACT

A framework and method for quality of service (QoS) aware resource discovery in mobile ad hoc networks are presented. Self-organized discovery agents manage the directory information that describes the network resources available for use by clients. In one embodiment, hash indexing of available resources is utilized. The discovery agents also partition the network into domains and collect intra- and inter-domain QoS information. This information is used to allow clients to select appropriate resource providers. This framework and method has low discovery latency and cost in terms of the number of packets for each resource discovery query.

6 Claims, 8 Drawing Sheets

OTHER PUBLICATIONS

C. E. Perkins and E. M. Royer, "Ad Hoc On-Demand Distance Vector Routing," in *Proceedings of the 2nd IEEE Workshop on Mobile Computing Systems and Applications*, Feb. 1999.

D. B. Johnson and D. A. Maltz, "Dynamic Source Routing in Ad Hoc Wireless Networks," in *Mobile Computing*, edited by T. Imielinski and H. Korth, Chapter 5, Kluwer Publishing Company, 1996.

S.-J. Lee, "Routing and Multicasting Strategies in Wireless Mobile Ad Hoc Networks," Ph.D. Dissertation, University of California, Los Angeles, 2000.

E. Guttman, C. Perkins, J. Veizades, and M. Day, "Service Location Protocol, Version 2," *RFC 2608*, Jun. 1999.

I. Stoica, R. Morris, D. Karger, F. Kaashoek, and H Balakrishnan, "Chord: A Scalable Peer-to-Peer Lookup Service for Internet Applications," *Proceedings of ACM SIGCOMM 01*, Sep. 2001.

S. Ratnasamy, P. Francis, M. Handley, R. Karp, S. Shenker, "A Scalable Content-Addressable Network," in *Proceedings of ACM SIGCOMM 01*, Sep. 2001.

R. Wolski, "Forecasting Network Performance to Support Dynamic Scheduling," in *Proceedings of the 6th IEEE International Symposium on High Performance Distributed Computing*, 1997.

Z. Fei, S. Bhattacharjee, E. W. Zegura, and M. H. Ammar, "A Novel Server Selection Technique for Improving the Response Time of a Replicated Service," in *Proceedings of IEEE INFOCOM 98*, Apr. 1998.

K. Konishi, "Report on Large Scale Networking Workshop," Mar. 2001. http://www.jp.apan.net/meetings/0103-NGI-workshop.

P. Mockapetris, "Domain Names—Concepts and Facilities," *RFC 1034*, Nov. 1987.

P. Francis, S. Jamin, C. Jin, D. Raz, Y. Shavitt, and L. Zhang, "IDMaps: A Global Internet Host Distance Estimation Service," to appear in *IEEE/ACM Transactions on Networking*, Oct. 2001.

A. Ephremides, J. E. Wieselthier, and D. J. Baker, "A Design Concept for Reliable Mobile Radio Networks with Frequency Hopping Signaling," in *Proceedings of the IEEE*, vol. 75, No. 1, pp. 56-73, 1987.

The Official Bluetooth: http://www.bluetooth.com/.

Notes on NAVSTAR GPS Operations. Available at website: http://tycho.usno.navy.mil/gpsinfo.html.

R. Iannella, "Internet Resource Discovery Issues," http://archive.dstc.edu.au/RDU/reports/QuestNet95.html.

"Decentralized Resource Discovery in Large Peer-based Networks," http://cubicmetercrystal.com/alpine/discovery.html.

Z. Fu and N. Venkatasubramanian, "Combined Path and Server Selection in Dynamic Multimedia Environments," in *Proceedings of ACM Multimedia 99*, Oct. 1999.

R. van Renesse, "Scalable and Secure Resource Location," in *Proceedings of IEEE Hawaii International Conference on System Sciences*, Jan. 2000.

S. Czerwinski, B. Zhao, T. Hodes, A. Joseph, and R. Katz, "An Architecture for a Secure Service Discovery Service," in *Proceedings of ACM MOBICOM99*, Sep. 1999.

* cited by examiner

FRAMEWORK AND METHOD FOR QOS-AWARE RESOURCE DISCOVERY IN MOBILE AD HOC NETWORKS

CROSS-REFERENCE TO RELATED PATENT APPLICATION

This patent application is a continuation of Ser. No. 10/051, 449, filed Jan. 18, 2002 now U.S Pat. No. 7,113,796, entitled "Framework and Method for QoS-Aware Resource Discovery in Mobile Ad Hoc Networks." The entire teachings and disclosure of this patent application are hereby incorporated in their entireties by reference thereto.

FIELD OF THE INVENTION

The present invention relates generally to resource discovery techniques, and more particularly to resource discovery and QoS-aware resource selection techniques in mobile, ad hoc networks.

BACKGROUND OF THE INVENTION

An ad hoc network is generally formed by a set of wireless mobile nodes or hosts. Communication between two network nodes that are not in direct radio range takes place in a multi-hop fashion, with other nodes acting as routers. Ad hoc networks can be used in military and rescue operations, as well as in meetings where people want to share information quickly.

Recently, the rising popularity of network-based applications among end users and the potential use of ad hoc networks in civilian life have led to research interests in resource sharing in large-scale ad hoc networks. With the rapid increase of available resources and accessing requests, a crucial requirement here is that a resource should be located without excessive overhead and long latency. In addition, providing desirable Quality-of-Service (QoS) is an important design objective. Specifically, when there are multiple/replicated providers for the same resource, the best one should be selected according to some QoS metrics to improve user experience. That is, an efficient and QoS-aware resource discovery system is needed.

Most previous work on resource discovery has focused on fixed-infrastructure networks, specifically, the Internet. However, ad hoc networks have several distinct features that make this more challenging. The most important feature is that the topology of an ad hoc network changes with time. As a result, the design of the routing protocols for ad hoc networks is quite different from that for the Internet. For example, it has been shown that, in this case, re-active (on-demand) routing protocols are usually more efficient and scalable than traditional pro-active (table-driven) protocols. In addition, to be robust in face of topology changes and node failures, applications for an ad hoc network generally prefer distributed and dynamic control mechanisms to centralized and static mechanisms. However, the latter has proven to be efficient for many Internet applications or services, such as the Domain Name System (DNS).

Furthermore, in previous resource discovery systems, the QoS to be delivered to a client is seldom considered. Some systems propose to use client-based probing techniques after discovery. However, probing measures the QoS in a very short period. This is not very effective in mobile ad hoc networks because of the mobility and wireless channel variations. Some discovery standards have been proposed for ad hoc networks, such as the Service Discovery Protocol for Bluetooth. However, they are limited to very small-scale networks, and do not consider QoS.

There exists, therefore, a need in the art for a resource discovery system for large-scale mobile ad hoc networks that provide resource selection on a QoS-aware basis.

BRIEF SUMMARY OF THE INVENTION

The system and method of the present invention presents new and improved design principles for QoS-aware resource discovery in mobile ad hoc networks. First, directory information is distributed to only a small set of fault-tolerant discovery agents. Most messages for discovery are exchanged among these agents to reduce the overhead of broadcast and route discovery. Only low frequency or controlled broadcast is used to distribute some quasi-static or local information, such as the addresses or locations of the agents. Second, hash indexing is applied to these agents to reduce query latency. Finally, QoS information is monitored continuously using a distributed mechanism. The key entities of the framework of the present invention are a set of self-organized Discovery Agents (DAs), which efficiently integrate three functionalities that are specially designed for mobile nodes: (1) directory information organization and query; (2) dynamic domain formation; (3) intra- and inter-domain QoS information monitoring.

In a mobile ad hoc network having a plurality of nodes, at least one node of which being a resource provider, a quality of service (QoS) aware resource discovery method in accordance with one embodiment of the present invention comprises the steps of generating at least one discovery agent from the plurality of nodes, and forming at least one dynamic domain within the ad hoc network. Each dynamic domain includes at least a subset of the nodes as members and one discovery agent. The one discovery agent serves as a home discovery agent for its associated dynamic domain. The method further includes the steps of registering a resource with the home discovery agent of the resource provider's associated dynamic domain, generating a query to discover the resource, and discovering the resource.

In a preferred embodiment of the present invention, the method of generating a discovery agent comprises the steps of broadcasting, by all eligible nodes, existence information including a node address, and electing the node that has the smallest node address as an initial discovery agent. Further, the method comprises the steps of selecting, by the initial discovery agent, a preselected number of nodes to be discovery agents. Each discovery agent is then assigned an index.

In accordance with the present invention, forming a dynamic domain within the ad hoc network comprises the steps of broadcasting, by a discovery agent, a formation announcement containing at least a distance field. The receiving nodes compare the distance field to a distance from the node's current home discovery agent. When the distance field is less than the distance from the node's current discovery agent, or when the receiving node does not have a current home discovery agent, the node sets the discovery agent that broadcast the formation announcement as the node's new home discovery agent. Preferably, the node then forwards the formation announcement to the node's neighbors.

In accordance with the present invention, registration of a resource with the home discovery agent of the resource provider's associated dynamic domain comprises the step of sending a resource registration request to the resource provider's home discovery agent. The registration request preferably includes an attribute α of the resource that is used to calculate a hashing index β of the resource as β=H(α). The resource registration request is then distributed to discovery agents having an index of $\beta, \beta+1, \ldots, \beta+K-1$ for registration of the resource.

To ensure fault tolerance, an embodiment of the method of the present invention includes the steps of discovering a failed discovery agent and broadcasting a discovery agent selection message. The method further comprises the steps of receiving responses from non-discovery agent nodes, comparing a distance from each non-discovery agent node from which a response was received to the failed discovery agent to determine which is closest to the failed discovery agent, and selecting the closest of the non-discovery agent nodes to be a new discovery agent for the failed discovery agent. The new discovery agent then assumes the index i of the failed discovery agent, and recovers the failed discovery agent's directory information from at least one discovery agent having an index of $i-K+1, i-K+2, \ldots, i+K-1$.

The method of the present invention further comprising the step of collecting, by a resource provider's home discovery agent, application-level quality of service (QoS) information from the resource provider. In an alternate embodiment, the method further comprises the step of estimating, by each home discovery agent, path quality of service (QoS) between nodes in its associated dynamic domain and those of another dynamic domain as the path latency between itself and the home discovery agent for the other dynamic domain.

The present invention further provides a method of discovering resource information comprising the steps of transmitting, by a node to its home discovery agent, a directory query for a resource, and searching, by the node's home discovery agent, for the requested resource directory information. When the requested resource directory information is not found, the method includes calculating, by the home discovery agent, the hashing index of the resource to determine a qualified set of discovery agents that should have the requested resource directory information The home discovery agent the forwards the directory query to one of the discovery agents in the qualified set. The method further includes receiving, by the home discovery agent, the requested resource directory information, and forwarding the requested resource directory information to the node. Preferably, the step of forwarding the directory query comprises the steps of determining which of the qualified set of discovery agents is closest to the home discovery agent, forwarding the directory query to the closest discovery agent in the qualified set, and when the closest discovery agent is unable to provide the requested resource directory information, forwarding the directory query to the next closest discovery agent until the information is found.

In an embodiment of the present invention, the method of discovering a resource comprises the steps of transmitting, by a node to its home discovery agent, a quality of service (QoS) query for a resource to be accessed, and, searching, by the node's home discovery agent, for the requested resource. When the requested resource is not found, the method includes the steps of calculating, by the home discovery agent, the hashing index of the resource to determine a qualified set of discovery agents that should have the requested resource, and forwarding, by the home discovery agent, the QoS query to at least one of the discovery agents in the qualified set. The method further comprises the steps of forwarding, by the at least one discovery agent in the qualified set, the QoS query to the home discovery agents for resource providers having the resource requested, returning, by the home discovery agents for resource providers having the resource requested, QoS and address information for the resource providers in their home domains having the resource requested, selecting a resource provider having the best QoS, and forwarding the address information of the resource provider having the best QoS to the node.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
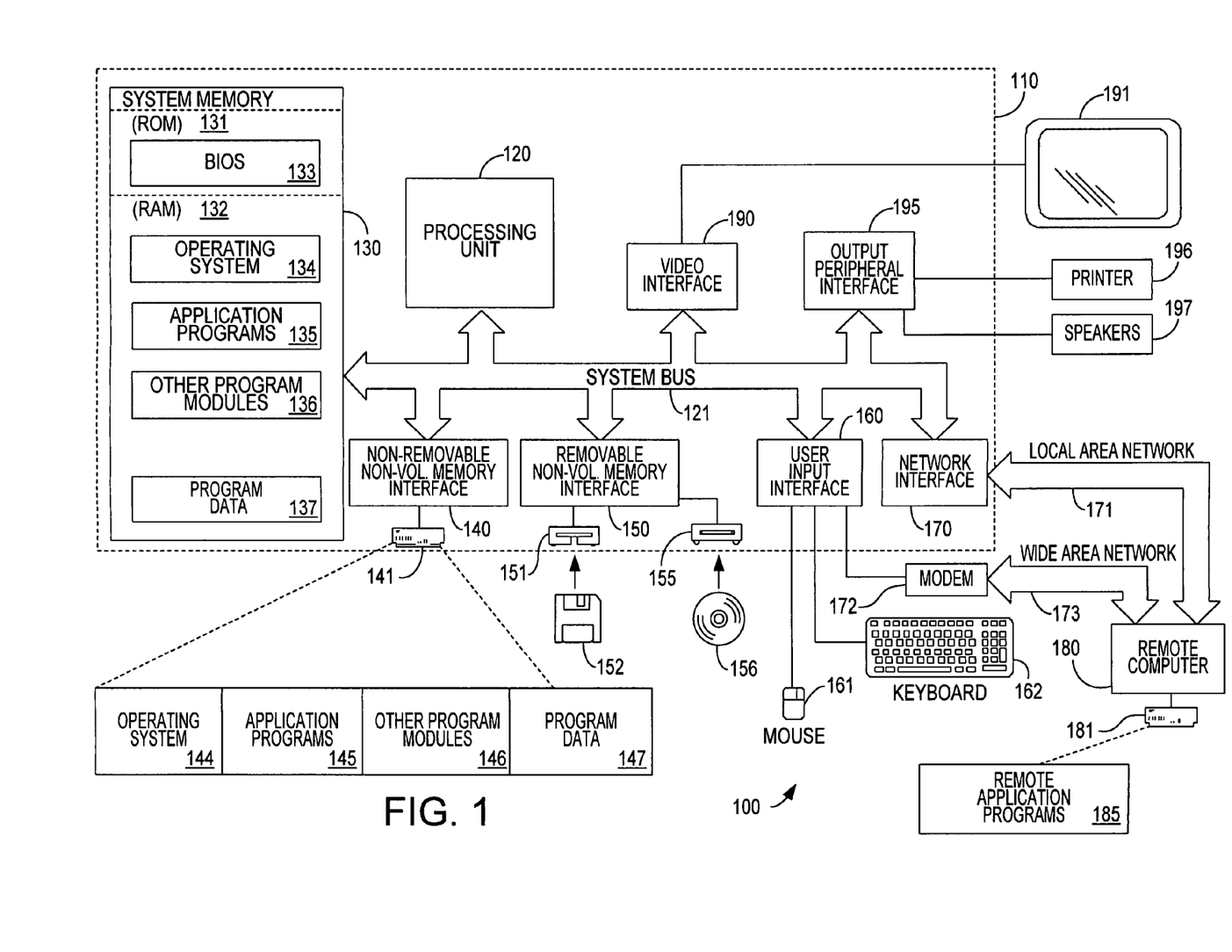
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The framework of the present invention is, not limited in a Windows environment, built on the application layer to provide generic and efficient tools for QoS-aware resource discovery. In this framework, it is preferable that all nodes are cooperative and can communicate with each other via some single-hop or multi-hop path. Each node can take one or more of three roles. The first role is as a client that initiates a query for resource discovery and uses resources. There are two basic discovery modes implemented by a client. The first is a browsing mode where a client is looking for all resource providers that have the requested resource. The second discovery mode is an accessing mode. In this mode a client is looking for a resource provider that could provide the best quality-of-service for a selected resource. The second role that may be assumed by a node is that of a resource provider (RP) that provides resources for clients. A RP is also responsible for registering the directory information of its resources and advertising its QoS information to nodes that have assumed the third role, discovery agents (DAs).

A discovery agent (DA) is a node that performs many of the important operations in the framework of the present invention. First, DAs collectively maintain directory information of the resources provided by the RPs. Preferably, the DAs use hash indexing for this directory information. This provides fault-tolerance and fast query response. Second, DAs dynamically partition the whole network into dynamic domains. Each DA maintains a separate domain and acts as the home DA of that domain. The home DA monitors the QoS information of the RPs in its domain, and responds to discovery queries from clients in this domain. Third, all registration and query messages are exchanged between DAs. These frequently exchanged messages are also used to continuously estimate peer path QoS, such as the delay between two DA nodes.

Figure 2:
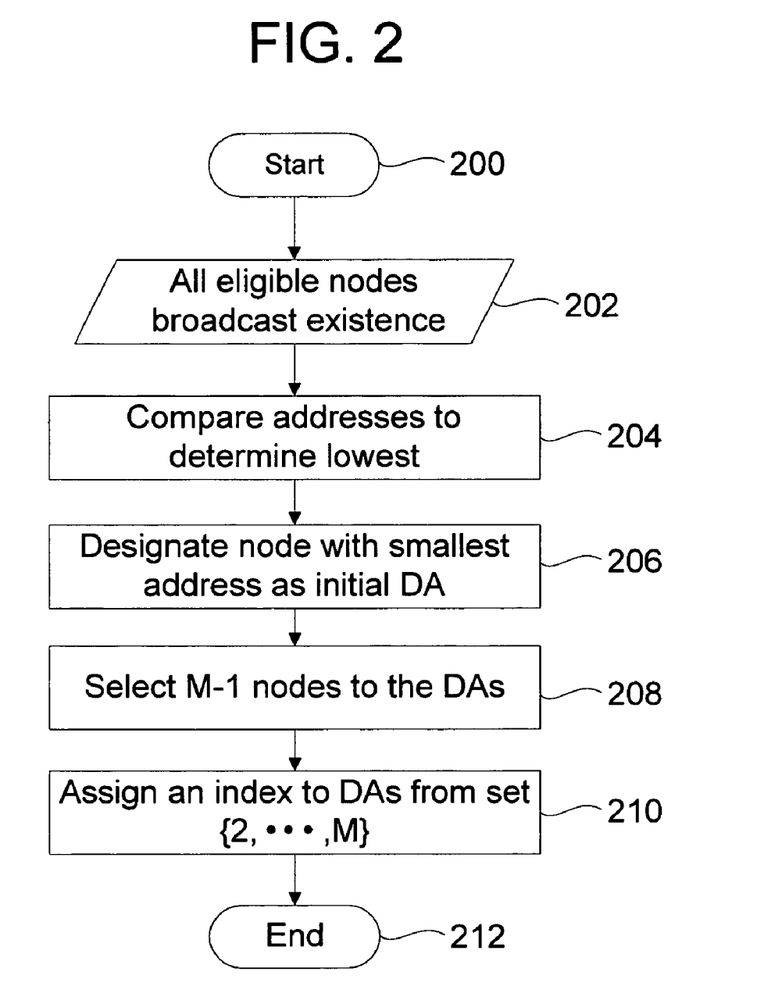
FIG. 2 is a simplified flow diagram illustrating a discovery agent (DA) generation method in accordance with the teachings of the present invention.

Initially, there are no DA nodes in the ad hoc network. They are generated through a bootstrapping process illustrated in FIG. 2. First, one node is elected as the initial DA using a procedure similar to the cluster head selection in the lowest-ID algorithm for ad hoc networks described in A. Ephremides, J. E. Wieselthier, and D. J. Baker, "A Design Concept for Reliable Mobile Radio Networks with Frequency Hopping Signaling," in *Proceedings of the IEEE*, Vol. 75, No.1, pp. 56-73, 1987, the teachings and disclosure of which are incorporated herein by reference. That is, once the process is begun 200, all eligible nodes broadcast 202 to the whole network about their existence to take part in the election of the initial DA. The one with the smallest address as determined at step 204 will win the election and will be designated as the initial DA at step 206. If there are to be a number M of DAs generated for the network (the choice of M will be discussed hereinbelow), the initial DA will then randomly select another M−1 nodes to form the set of M DAs at step 208. The initial DA will then assign each of other M−1 DAs a unique index in the set of $\{2, \ldots, M\}$ at step 210 (the initial DA reserving the index 1 for itself) before ending 212.

Figure 3:
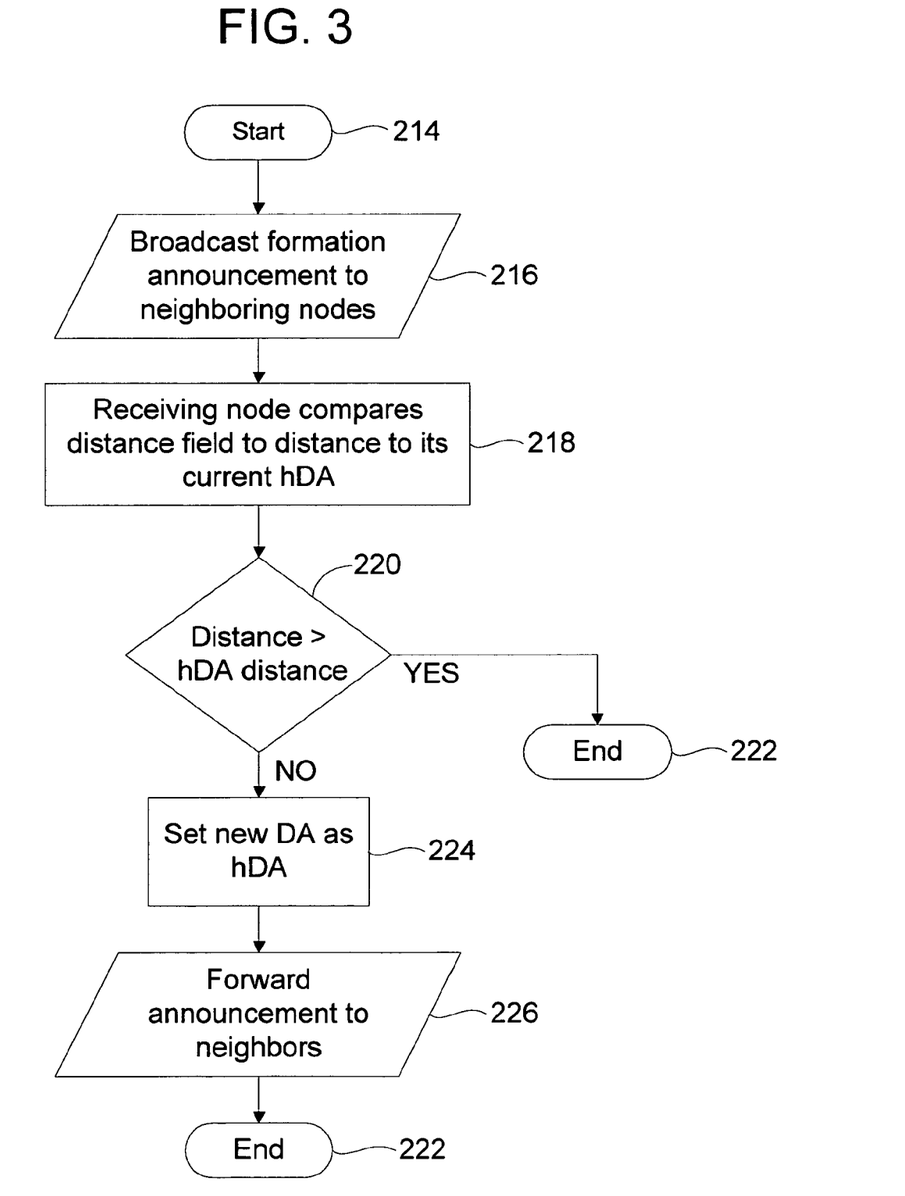
FIG. 3 is a simplified flow diagram illustrating a dynamic domain formation method in accordance with the teachings of the present invention.

After the DAs are generated, their addresses are periodically broadcasted to the whole network at a low frequency. In addition, each non-DA node tries to find the nearest DA as its "home" DA (hDA), and join that DA's domain. In an ad hoc network both DAs and other nodes move over time. Hence, the members in a domain change over time. To account for this mobility, a dynamic domain formation process illustrated in FIG. 3 is periodically performed for each DA so that it may update its domain members, i.e. dynamically reform its domain with nodes that are close to the DA. Here, a non-negative and additive metric is used to measure distance, which can be the number of hops or delay in practice. Based on the properties of the shortest paths with this type of metric, a simple distributed algorithm to form dynamic domains is used.

To form these dynamic domains 214, a DA periodically broadcasts a formation announcement to its neighboring nodes at step 216, which includes the DA's index, expiration time of the announcement, and a distance field. The distance field records the distance between the DA and the node that receives the announcement. Upon receiving an announcement, a non-DA node first checks the value of the distance field at step 218. If it is larger than the distance to its current home DA at step 220, the node stops forwarding the announcement and the process at that node ends 222. However, if the distance field is smaller than the distance to its current home DA (hDA) at step 220, the node will set this new DA as its home DA at step 224, and forward the announcement to all its neighboring nodes at step 226 before ending 222. Each of these neighboring nodes will perform the same analysis process to determine if they need to replace their current home DA with the new DA, i.e. dynamically change their domain membership.

Figure 4:
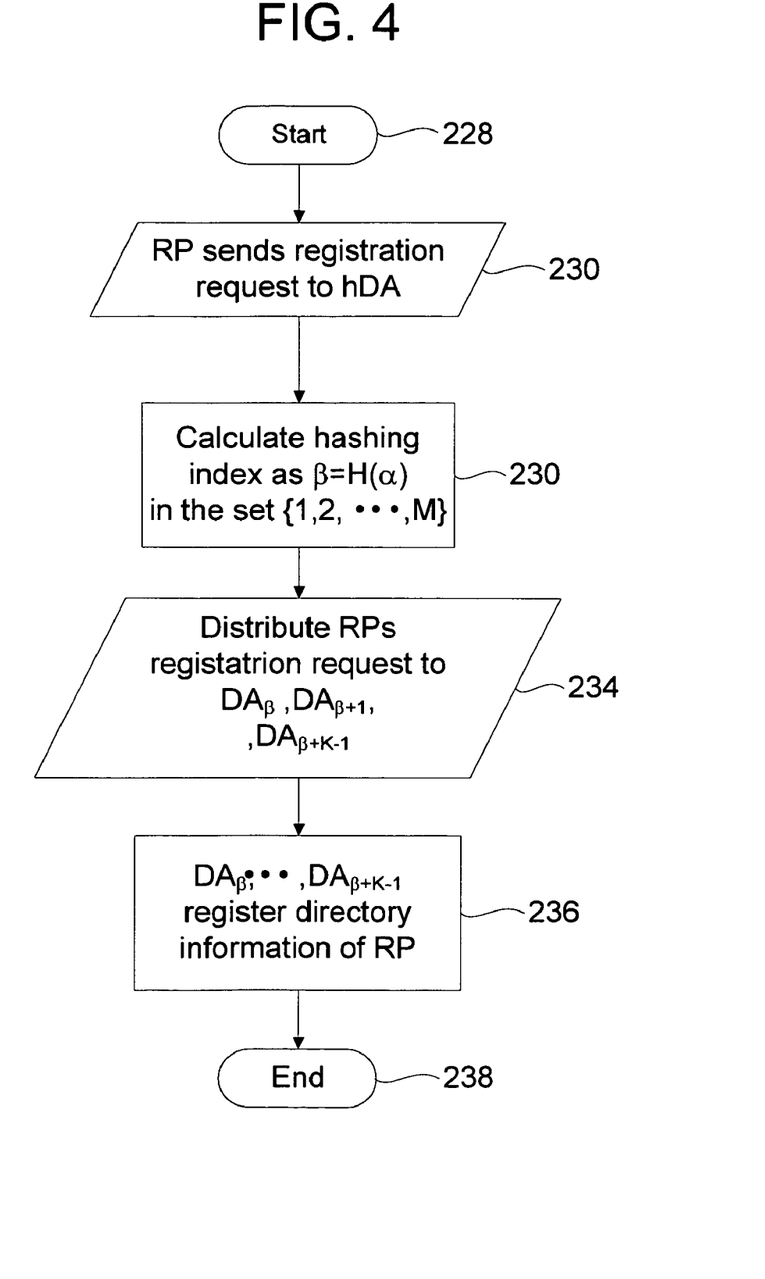
FIG. 4 is a simplified flow diagram illustrating a resource registration method in accordance with the teachings of the present invention.

In the framework of the present invention, each resource has an attribute that is known to all intended clients in the network. To register a resource, the process illustrated in FIG. 4 is performed. Once begun 228, the resource provider (RP) first issues a registration request to its home DA (hDA) at step 230. The request includes the provider's address, attribute, expiration time, and other directory related information. A hashing function is used by the hDA at step 232 to establish an index that will allow the resources to be discovered with reduced query latency. That is, if it is assumed that the attribute of the resource is a, a hashing function H( ) is used to produce an index $\beta=H(\alpha)$ in the set of $\{1,2,\ldots,M\}$. The home DA for this RP will then distribute at step 234 that RP's registration request only to those DAs in the group $DA_\beta$, $DA_{\beta+1}, \ldots, DA_{\beta+K-1}$. The directory information of the resource will, therefore, be registered to these DAs at step 236 before this process ends at step 238.

This organization scheme has several advantages. First, the replicated providers of the same resource always register to the same DAs, i.e. the same resource has the same attribute and therefore the same hashing index $\beta$. As a result, the full list of the directory information for all RPs that provide the requested resource may be obtained from any one of the DAs in the group $DA_\beta$, $DA_{\beta+1}, \ldots, DA_{\beta+K-1}$, where K is the number of replications desired for this information (the choice of which is discussed below). Second, the directory information of a resource can be quickly located by using hash indexing. Note that different resources may have the same attribute and their directory information will thus be stored in the same DAs. Hence, the system of the present invention does not preclude the use of fuzzy searches in a DA, such as a wildcard-based search.

Figure 5:
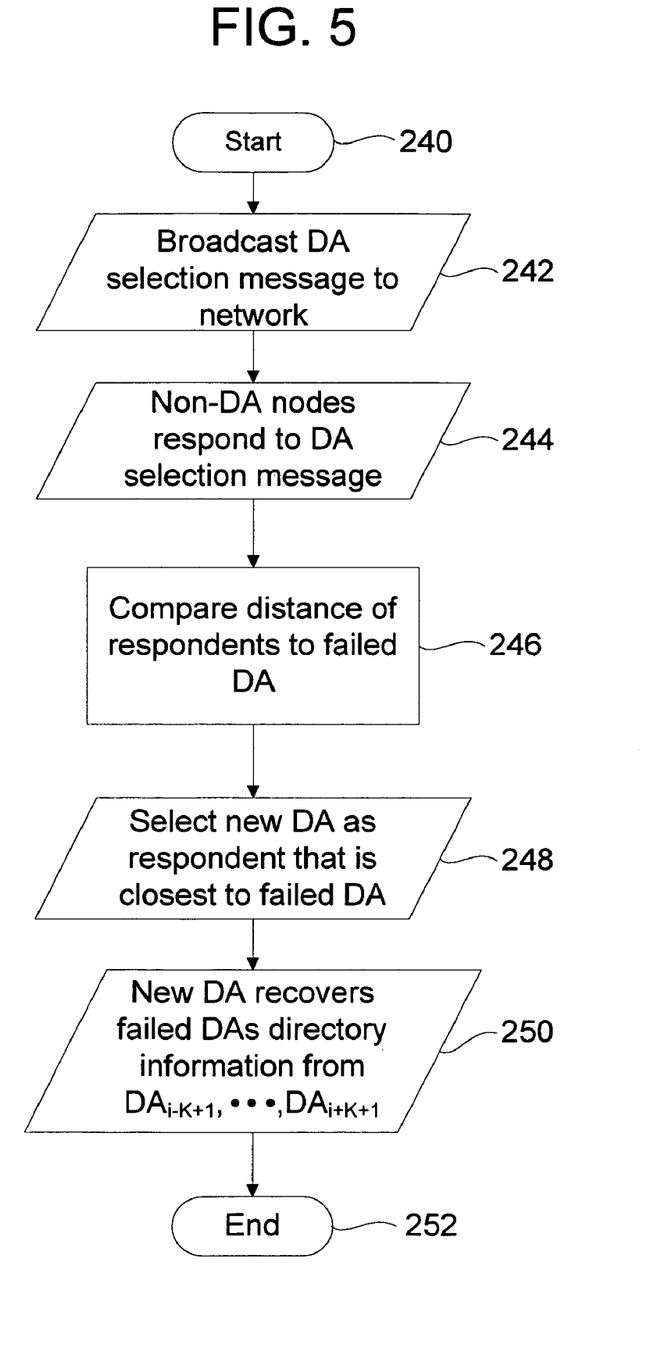
FIG. 5 is a simplified flow diagram illustrating a discovery agent selection method in accordance with the teachings of the present invention.

A third advantage of this scheme is that it provides fault tolerance if the number of replications, K, is larger than 1. That is, suppose the nodes are homogeneous with a failure probability p. The number of replications, K, therefore, should be set to $\lceil \log_{1-p} A \rceil$, where A is the availability requirement for the directory information. When a DA is found failed by another DA in the discovery query process (discussed below), a process to select a new DA (to maintain M DAs in the network) and replicate the failed DAs information will be undertaken. This process, illustrated in FIG. 5, is begun 240 by having the DA that discovers the failure of a DA broadcast a DA selection message to the network 242. Non-DA nodes that are willing to take the place of the failed DA will respond to this message at step 244. The DA that initiated the process will compare the addresses of the respondents to that of the failed DA at step 246, and will select the one with the minimal last-known distance to the failed DA at step 248. If one assumes that the index of the failed DA is i, then the directory information that was contained on the now-failed $DA_i$ can then be recovered from the subset of $DA_{i-K+1}, DA_{i-K+2}, \ldots, DA_{i+K-1}$ at step 250 before the process ends 252.

A DA is also responsible for QoS information collection and prediction. Note that the requirements of QoS are highly application-specific. Hence, the framework of the present invention provides generic QoS information to different applications to achieve a flexible solution. Specifically, the first type of QoS information is application-level QoS, including the CPU usage and available memory of a RP. A RP periodically provides this information to its home DA. The second type is path QoS between two nodes. Preferably, the path delay (packet latency) between two nodes is considered, which is one of the most useful path QoS metrics for many applications. However, other path metrics, such as bandwidth, can also be incorporated into the framework of the present invention. In a preferred embodiment of the framework of the present invention, the clocks of all DAs are synchronized by some global time service, such as the Universal Time Coordinate (UTC) service provided by the Global Position System (GPS), and the messages exchanged between DAs carry a timestamp. Thus, DAs can predict their peer path delay by an Autoregressive Moving Average (ARMA) predictor, which uses the packet latency calculated from those frequently-exchanged messages.

For non-DA nodes, the framework of the present invention preferably does not directly measure their path QoS by exchanging probing message between RP-Client pairs. There are several reasons why this is not desired. First, probing may trigger high-cost route discovery operations if two nodes seldom communicate with each other. Second, the time for using a resource is usually much longer than the time for probing, and a short time probe may give a different estimation compared to the statistical behavior of a path. Hence, instead of using probing, the framework uses an approximation method. In this approximation method it is assumed that the nodes in a dynamic domain are QoS-similar, and the home DA is used as a representative. The path QoS between two non-DA nodes is approximated by the path QoS between each of their home DAs. When there are enough DAs that move independently, the error of this approximation is small.

Figure 6:
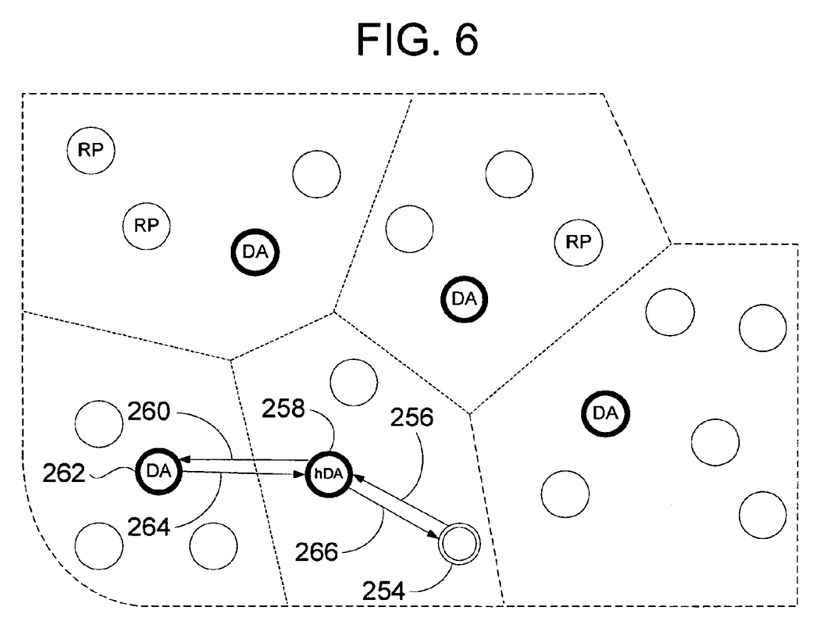
FIG. 6 is a simplified ad hoc framework network diagram illustrating a directory query method in accordance with the teachings of the present invention.

In the framework of the present invention, resource discovery is done in two phases. The first phase is for clients who are in a browsing mode and who want a full list of RPs that have the resource of interest to the client. In this mode, a directory query for searching the resource directory information in the DA set is generated by a client node 254. Such a directory query will be explained with reference to FIG. 6 wherein the various dynamic domains are illustrated by the dashed lines separating each grouping of nodes. Also in this FIG. 6, the home DAs for each dynamic domain are illustrated in bold, and the various resource providers (RPs) are designated with an RP. The client 254 first sends the directory query to its home DA (denoted as hDA 258) illustrated as line 256. If the hDA 258 has no cached record that matches the client's directory query, the hDA 258 will calculate the hashing index of the resource, $\beta$, to decide the qualified DA set, $DA_\beta$, $DA_{\beta+1}, \ldots, DA_{\beta+K-1}$ that should have the requested resource. The query is then forward via line 260 to the DA 262 that is in the qualified DA set and that is the nearest to the hDA 258. If this DA 262 fails, the hDA 258 will try to forward the query to the next nearest DA in the qualified set, until the query is successful. In this browsing mode, a full list of RP candidates (the providers that have the requested resource) is returned to the hDA 258 as illustrated by line 264. The hDA 258 then forwards this list to the client 254 that initiated the query illustrated as line 266.

Figure 7:
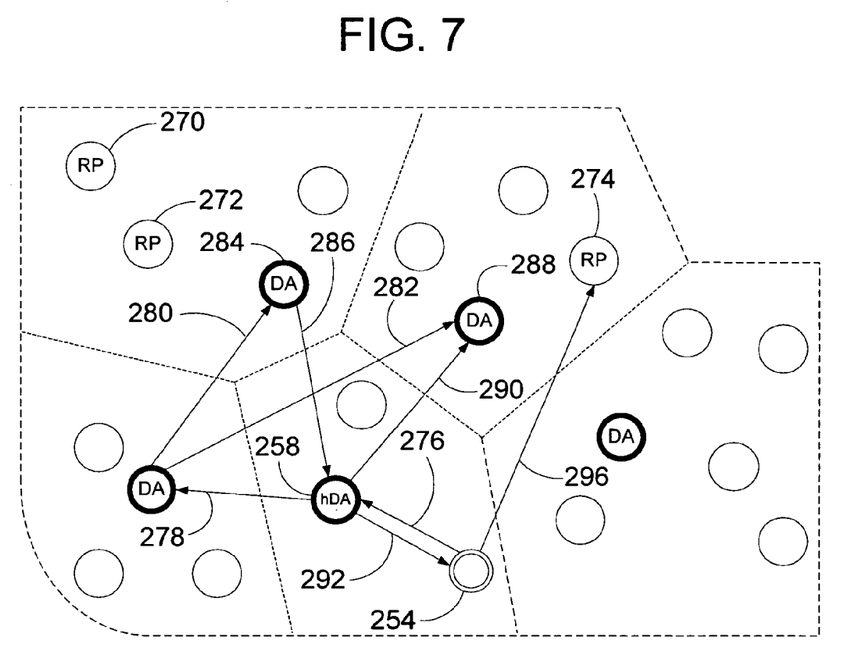
FIG. 7 is a simplified ad hoc framework network diagram illustrating a QoS query method in accordance with the teachings of the present invention.

The second phase of resource discovery is for clients who actually want to access a resource in an accessing mode. In this mode when the client 254 requests to access a resource (line 246) the hDA 258 performs a QoS query in which it compares the QoS provided by all RP candidates 270, 272, 274, and then selects the best one (274 as illustrated in FIG. 7). To this end, the hDA 258 preferably queries (line 278) all DAs that are in the qualified DA set $DA_\beta$, $DA_{\beta+1}, \ldots, DA_{\beta+K-1}$ (DA 262 only in FIG. 7). In one embodiment of the present invention, a parallel search strategy is used. In this strategy the DA 262 that has the directory information for the requested resource sends via lines 280 and 282 a QoS query to all the home DAs of the candidate RPs using multicast, or multiple-unicast if the underlying routing protocol does not support multicast. The query includes the index of hDA 258, the list of the RP candidates 270, 272, and 274, and the type of QoS of interest. If there are one or more RP candidates in a DA's dynamic domain (DAs 284, 288), that or those DAs 284, 288 will respond (illustrated as lines 286 and 290, respectively) to the hDA 258 by providing the addresses of the RP candidates 270, 272, and 274 and the corresponding QoS information for each. The QoS of all RP candidates 270, 272, and 274 are then compared by hDA 258 according to the requirement of the client 254, and the result (directory information for the RP that best satisfies the QoS) is returned via line 292 to the client 254. Finally, the client 254 accesses the desired resource from the selected RP 274 using appropriate protocols via line 296.

To aid in an understanding of the advantages and operational characteristics of the framework of the present invention, the following discussion will present an exemplary mobile ad hoc system to which the framework of the present invention is particularly well suited. However, this exemplary system is presented by way of example and not by way of limitation. In the exemplary network assume that there are, e.g., 200 mobile nodes, whose initial positions are chosen from a uniform distribution over an area of 1000 m by 1000 m. The mobility model of the exemplary system is chosen to be random waypoint, although this model is not limiting on the system. The nodes' moving speeds may be assumed to be uniformly chosen from 10 to 72 km/hr as these speeds are fairly typical within such a system. The IEEE 802.11 protocol is used as the MAC layer protocol, although other protocols may be used as appropriate. Each wireless channel may be assumed to have approximately 2 Mbps bandwidth and a circular radio range with 250 m radius. For routing, this exemplary system to demonstrate the framework of the present invention uses the Ad hoc On-demand Distance Vector (AODV) protocol.

To demonstrate aspects of the invention it is assumed in this exemplary environment that there are 100 different resources that may be requested. The popularity of each resource, measured in number of requests per minute, is randomly distributed between 1 to 5 requests per minute. For each discovery query, the client that initiates the query is randomly selected in the network. Each resource is served as a CBR stream of 28 Kbps and lasting 30 seconds. In the following example, the path QoS of interest is the average packet latency, which is relatively easy to estimate and the most generally useful.

For the sake of comparison, a traditional framework, in which locating a resource and selecting a provider are considered as two separate issues, will also be discussed. The resource discovery method used in this traditional framework is centralized directory-server based. When there are replicated providers, a client sends 15 consecutive packets to each provider to estimate path delay, and selects the one with the minimum average delay.

First, these exemplary systems will be discussed with respect to the query latency and cost of the exemplary embodiment of the framework of the present invention and the traditional framework. The number of replicated providers, $N_p$ for each resource is varied from 1 to 10. However, the average query latency is nearly independent of $N_p$ in both frameworks, and also independent of M, the number of DAs in the exemplary embodiment of the framework of the present invention. This is because QoS queries to different DAs or probes to different providers are sent simultaneously. Table 1 lists the query latency in different phases, including during the directory query phase and the QoS query phase. It can be seen that, in the exemplary framework of the present invention, the average latency for the directory query phase is slightly higher than that in the traditional framework. This is because, in the traditional framework, a client needs to contact a directory server only, while in exemplary framework of the present invention, a client needs to contact not only the home DA but also the DA that stores directory information as discussed above.

However, the latency of the QoS query phase in the exemplary framework of the present invention is much lower than that in the traditional framework. As a result, the total latency in the traditional framework is about 2.2 times that of the framework of the present invention. This is because the QoS query phase in the exemplary embodiment of the framework of the present invention involves only querying all of the DAs. The latency is thus bounded by the time-out factor between the home DA and the furthest DA. On the other hand, probing in the traditional framework involves not only the transmission of a packet from a client to a provider, but also several cycles of this process.

TABLE I

Comparison of discovery latencies.

| Framework | Latency (ms) | | |
|---|---|---|---|
| | Directory Query | QoS Query | Overall |
| Traditional | 287 | 1375 | 1662 |
| Exemplary Embodiment of the Framework of the Instant Invention | 395 | 354 | 749 |

Figure 8:
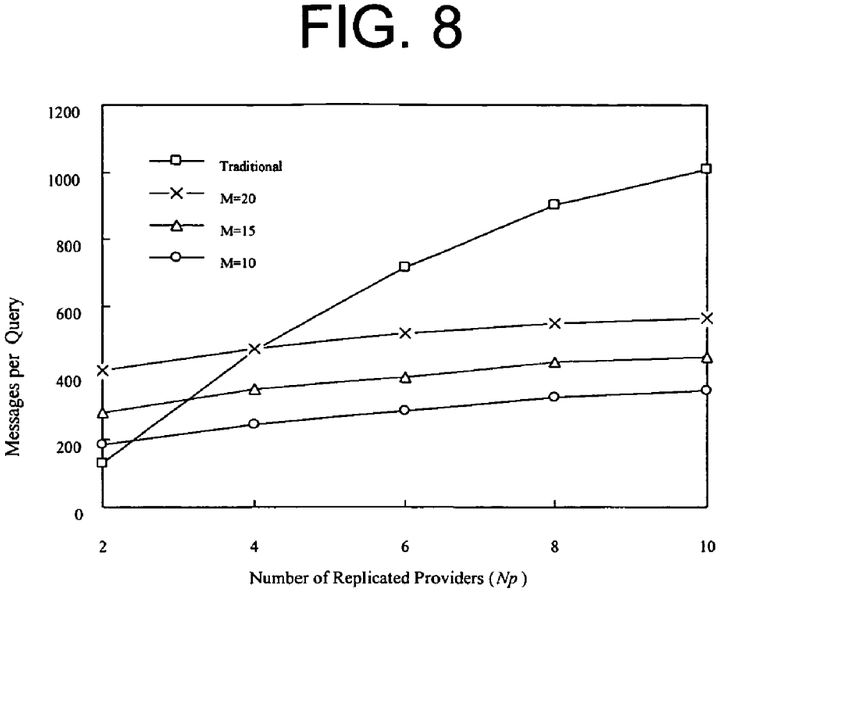
FIG. 8 is a graphical illustration of a comparison of discovery costs per number of replicated providers.

FIG. 8 shows the average cost in terms of the number of messages (packets) transmitted in each of the networks for each discovery versus the number of replicated providers ($N_P$). It may be seen that, in the exemplary embodiment of the framework of the present invention, the cost is nearly independent of the number of replicated providers. This is because the QoS queries are always sent to all the DAs regardless of the number of providers. However, this does not hold true in the traditional framework because the client needs to probe every resource provider. As such, the cost increases nearly linearly with the increasing number of replicated providers. When there are more than 4 replicated providers, the traditional framework incurs much higher cost than that of the exemplary embodiment of the present invention. Note that in the QoS query phase of the framework of the present invention, it is possible to use a heuristic algorithm to avoid querying DAs whose domains do not cover any qualified provider.

Figure 9:
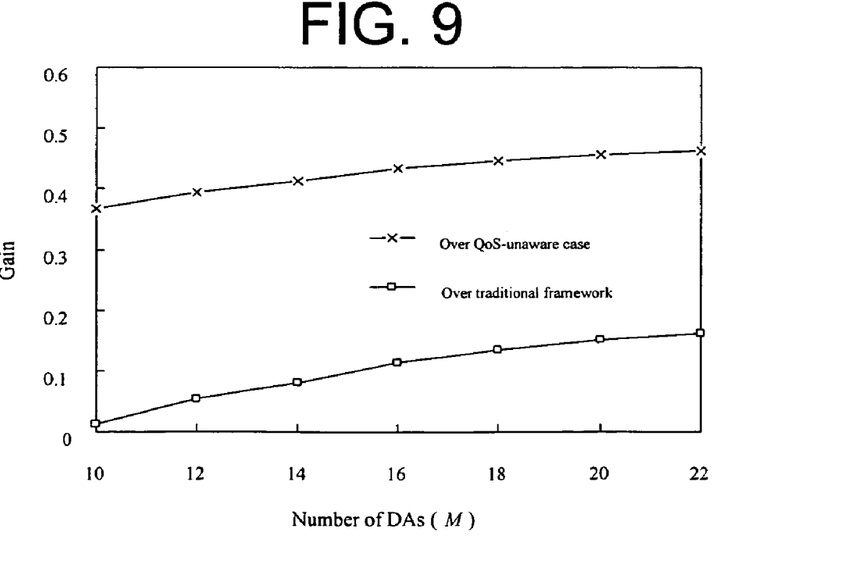
FIG. 9 is a graphical illustration of a comparison of performance gains per number of discovery agents.

The QoS-awareness of these two exemplary frameworks is now discussed to show the exemplary embodiment of the framework of the present invention's performance gains over the traditional framework and over a mobile ad hoc framework that is QoS-unaware (the resource provider is randomly selected), where the gains are calculated by normalizing the reduced packet latencies. FIG. 9 shows the results with $N_p$=5 and the number of DAs is varied from 10 to 20. As may be seen from FIG. 9, the performance gain of the framework of the present invention over the traditional framework increases with the increase of the number of DAs. This is because the expected area of a dynamic domain decreases when there are more DAs, and hence, in this case, it is more accurate to approximate the path QoS between two nodes using their home DAs as representatives. Specifically, when enough DAs are deployed, the gain of the framework of the present invention is up to 45% compared to the QoS-unaware case, and 15% to that of the traditional framework. Moreover, the gain tends to saturate when there are more than 20 DAs in this exemplary 200-node network. Hence, from FIGS. 8 and 9, the choice of about 15 DAs in a preferred embodiment provides satisfactory performance in terms of both discovery cost and accuracy. This number is much smaller than the total number of nodes.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. In a mobile ad hoc network having a plurality of mobile nodes, at least one mobile node of which being a resource provider, a quality of service (QoS) aware resource discovery method, comprising the steps of:

generating at least one discovery agent from the plurality of mobile nodes to service queries from other mobile nodes and to register resources provided by the resource provider;

forming at least one dynamic domain within the ad hoc network, each dynamic domain including at least a subset of the mobile nodes as members thereof and one discovery agent, the one discovery agent serving as a home discovery agent for its associated dynamic domain wherein the forming comprises broadcasting, by a discovery agent, a formation announcement containing at least a distance field; comparing, by a receiving node, the distance field to a distance from the node's current home discovery agent; when the distance field is less than the distance from the node's current discovery agent, and when the receiving node does not have a current home discovery agent, setting the discovery agent that broadcasts the formation announcement as the node's new home discovery agent;

registering a resource by the resource provider with the home discovery agent of the resource provider's associated dynamic domain;

generating by one of the mobile nodes within the ad hoc network a query mobile node's home discovery agent to discover the resource; and discovering by the one of the mobile nodes' home discovery agent the resource within the mobile ad hoc network regardless of the resource's location within or without of the one of the mobile nodes' dynamic domain.

2. The method of claim 1, wherein the step of generating at least one discovery agent comprises the steps of:

broadcasting, by all eligible nodes, existence information including a node address;

electing the node that has the smallest node address as an initial discovery agent.

3. The method of claim 1, further comprising the step of forwarding the formation announcement to the node's neighbors after the step of setting the discovery agent that broadcast the formation announcement as the node's new home discovery agent.

4. The method of claim 1, further comprising the step of collecting, by a resource provider's home discovery agent, application-level quality of service (QoS) information from the resource provider.

5. The method of claim 1, further comprising the step of estimating, by each home discovery agent, path quality of service (QoS) between nodes in its associated dynamic domain and those of another dynamic domain as the path latency between itself and the home discovery agent for the other dynamic domain.

6. In a mobile ad hoc network having a plurality of nodes, a subset of the nodes assuming a role of a discovery agent, a method of forming a dynamic domain within the ad hoc network, comprising the steps of:

broadcasting, by a discovery agent, a formation announcement containing at least a distance field;

comparing, by a receiving node, the distance field to a distance from the node's current home discovery agent, if any;

when the distance field is less than the distance from the node's current discovery agent, and when the receiving node does not have a current home discovery agent, setting the discovery agent that broadcast the formation announcement as the node's new home discovery agent; and forwarding, by the receiving node, the formation announcement to the node's neighbors after the step of setting the discovery agent that broadcasts the formation announcement as the receiving node's new home discovery agent.

* * * * *